(12) United States Patent
Groshon et al.

(10) Patent No.: US 6,351,811 B1
(45) Date of Patent: Feb. 26, 2002

(54) SYSTEMS AND METHODS FOR PREVENTING TRANSMISSION OF COMPROMISED DATA IN A COMPUTER NETWORK

(75) Inventors: Robert F. Groshon, Cedar Park, TX (US); L. Aaron Philipp; Jason C. Stone, both of Oklahoma City, OK (US)

(73) Assignee: Adapt Network Security, L.L.C., TX (US)

(*) Notice: Subject to any disclaimer, the term of this patent is extended or adjusted under 35 U.S.C. 154(b) by 0 days.

(21) Appl. No.: 09/298,069

(22) Filed: Apr. 22, 1999

(51) Int. Cl.[7] .................................................. H04L 9/00
(52) U.S. Cl. ....................................... 713/176; 713/201
(58) Field of Search ........................... 714/38, 799, 47, 714/6, 15, 20; 713/176, 200, 201, 202, 167; 707/202, 204, 200

(56) References Cited

U.S. PATENT DOCUMENTS

| | | | |
|---|---|---|---|
| 5,060,185 A | * 10/1991 | Naito et al. | 707/202 |
| 5,196,840 A | 3/1993 | Leith et al. | |
| 5,237,614 A | 8/1993 | Weiss | |
| 5,483,596 A | 1/1996 | Rosenow et al. | |
| 5,502,766 A | 3/1996 | Boebert et al. | |
| 5,576,755 A | * 11/1996 | Davis et al. | 348/13 |
| 5,724,426 A | 3/1998 | Rosenow et al. | |
| 5,771,291 A | 6/1998 | Newton et al. | |
| 5,818,654 A | * 10/1998 | Reddy et al. | 360/53 |
| 5,864,683 A | 1/1999 | Boebert et al. | |

FOREIGN PATENT DOCUMENTS

DE    198 38 253 A1  *  2/2000  .......... H04L/12/22

OTHER PUBLICATIONS

Tanenbaum, Andrew S. Computer Networks. Third Edition. Prentice Hall. 1996. pp. 613–622.*
Saleh, K. and K. Al–Saqabi. "Error Detection and Diagnosis for Fault Tolerance in Distributed Systems." Information and Software Technology. No. 39. 1998. pp. 975–983.*
Yakal, Kathy. "Sign on the Digital Line." PC Magazine. Aug. 29, 2000. p. 32.*
"Assured Website" E–Lock Technologies. Publication date unknown. Retrieved from the Internet via www.elock.com on Feb. 29, 2000.*

(List continued on next page.)

*Primary Examiner*—Gail Hayes
*Assistant Examiner*—Anthony DiLorenzo
(74) *Attorney, Agent, or Firm*—Burleigh & Associates; Roger S. Burleigh

(57) ABSTRACT

Systems and methods for controlling the transmission of data in a computer network; specifically, systems and methods related to preventing the transmission of compromised data. In one embodiment, a web server is configured to transmit requested data to a remote client through a computer network, such as the Internet. The web server includes a conventional computing system, including a processor and random access memory, and a non-volatile storage medium for storing the requested data. A software-defined process is executed by the computing system, whereby the software-defined process and the computing system cooperate to receive a request from a remote client for the requested data; determine whether the requested data has been compromised; and prevent the transmission of the requested data to the remote client if the data is compromised. Various techniques are disclosed for determining whether the requested data has been compromised, such as through comparison of a digital signature associated with the requested data to a control signature, which can be unique to the requested data or predefined for all data. Alternatively, or in addition to a comparison of signatures, the requested data may be directly compared to a secure copy of the requested data.

27 Claims, 5 Drawing Sheets

OTHER PUBLICATIONS

"G–Server—How it works" Gillian Technologies. Publication date unknown. Retrieved from the Internet via www.gilian.com on Aug. 21, 2000.*

"Gilian Technologies Announces Participation in F5 Networks Affinity Partner Program." Business Wire. p. 330. Apr. 24, 2000.*

"Frequently Asked Questions about Authenticode." FAQ Sheet. Microsoft Corporation. Feb. 17, 1997. Retrieved from the Internet via http://msdn.microsoft.com/workshop//security/authcode/signfaq.asp.*

"Microsoft Authenticode Technology" Whitepaper. Microsoft Corporation. Oct. 1996. Retrieved from the Internet via http://msdn.microsoft.com/workshop/security/authcode/authwp.asp.*

* cited by examiner

SYSTEMS AND METHODS FOR PREVENTING TRANSMISSION OF COMPROMISED DATA IN A COMPUTER NETWORK

TECHNICAL FIELD OF THE INVENTION

The present invention is directed, in general, to computer networks and, more specifically, to systems and methods for preventing transmission of compromised data in a computer network.

BACKGROUND OF THE INVENTION

The world is currently experiencing revolutionary changes in information systems, brought about, in part, by the general availability of access to the World Wide Web ("Web") via the Internet. As the Web grows in popularity, more and more organizations and individuals see it as an efficient, inexpensive means of distributing information, products and services. While the Web is an attractive distribution channel for this new generation of on-line services, those wishing to take advantage of the Web's presence must ensure security concerns are addressed. Organizations that wish to use the Internet to share information with employees, partners and clients must implement security that prevents electronic fraud such as data tampering, eavesdropping and masquerading.

The Computer Security Institute (CSI), among many other security-related private and governmental organizations, has conducted annual surveys in an effort to help raise the level of security awareness as well as determine the scope of computer crime in the United States and abroad. The CSI's "1999 Computer Crime and Security Survey" noted, in particular, that corporations, financial institutions and government agencies face threats from both external and internal access to their information systems. In that survey, 30% of respondents reported intrusions, and those reporting their Internet connection as a frequent point of attack rose from 37% of respondents in 1996 to 57% in 1999. It has also been reported that financial losses due to computer security breaches exceed $100,000,000 per year.

Although these survey results indicate a wide range of computer security breaches, perhaps the most disturbing trend is the continued increase in attacks from unauthorized external access. Of the respondents who reported unauthorized access or misuse, 38% reported from two to five incidents, and 26% reported 10 or more incidents. Several types of attack were specified in the CSI survey: 98% of respondents reported vandalism, 93% reported denial of service, 27% reported financial fraud, and 25% reported theft of transaction information. It is clear that computer crime and other information security breaches pose a growing threat to U.S. economic competitiveness and the rule of law in cyberspace. It is also clear that the financial cost is tangible and alarming.

The FBI, in response to an expanding number of instances in which criminals have targeted major components of information and economic infrastructure systems, has established National Infrastructure Protection and Computer Intrusion Squads in selected offices throughout the United States. The mission of these squads is to investigate violations of the Computer Fraud and Abuse Act of 1986, including intrusions to public switched networks, major computer network intrusions, privacy violations, industrial espionage, pirated computer software and other crimes where the computer is a major factor in committing the criminal offense. The seriousness of this mission was recently reinforced by the creation of the National Infrastructure Protection Center, located at FBI headquarters. Recognizing this country's unprecedented reliance on information technology, the Center, which is a joint partnership among federal agencies and private industry, is designed to serve as the government's lead mechanism for preventing and responding to cyber attacks on the nation's infrastructures.

Conventional methods of providing information system security include the use of "firewalls." A firewall is a system designed to prevent unauthorized access to or from a private network. Firewalls can be implemented in both hardware and software, or a combination of both. Firewalls are frequently used to prevent unauthorized Internet users from accessing private networks connected to the Internet, especially intranets. All messages entering or leaving the intranet pass through the firewall, which examines each message and blocks those that do not meet the specified security criteria. Although a firewall can provide a certain level of protection, they are only considered a first line of defense in protecting private information. For greater security, data can be "encrypted," which refers to techniques for ensuring that data stored in a computer cannot be read or compromised. Most conventional security measures involve data encryption and passwords. Data encryption is the translation of data into a form that is unintelligible without a deciphering mechanism. A password is a secret word or phrase that gives a user access to a particular program or system.

Although the use of firewalls and encryption techniques can provide some security, the fact that unauthorized persons continue to gain access to information systems illustrates that such security measures do not guarantee that data stored in such systems cannot be compromised. Thus, persons who access such data have no assurance of its accuracy, which could cause financial or other harm to such persons. For example, if publicly-available financial information for a company is compromised, a person who makes an investment decision based on the compromised information could risk losing the value of their investment. More seriously, compromised medical information could cause injury to a person's health. Therefore, there is a need in the art for systems and methods for preventing transmission of compromised data in a computer network. Preferably, such systems and methods should provide security that works seamlessly across applications and platforms such that it is transparent to users and easy for organizations to manage.

SUMMARY OF THE INVENTION

To address the above-discussed deficiencies of the prior art, the present invention provides systems and methods for controlling the transmission of data in a computer network; specifically, systems and methods related to preventing the transmission of compromised data. In one embodiment, a web server is configured to transmit requested data to a remote client through a computer network, such as the Internet. The web server includes a conventional computing system, including a processor and random access memory, and a non-volatile storage medium for storing the requested data. A software-defined process is executed by the computing system, whereby the software-defined process and the computing system cooperate to: i) receive a request from a remote client for the requested data; ii) determine whether the requested data has been compromised; and iii) prevent the transmission of the requested data to the remote client if the data is compromised. The principles of the present invention represent a shift in the approach to conventional network security. The present invention recognizes that, in many cases, the greatest harm resulting from compromised data stems not from the fact that some person has gained unauthorized access to and altered the data, but that some other person may unknowingly rely on the compromised data.

Various techniques are disclosed for determining whether the requested data has been compromised, such as through comparison of a digital signature associated with the requested data to a control signature. A control signature can be unique to the requested data or predefined for all data. Alternatively, or in addition to a comparison of signatures, the requested data may be directly compared to a secure copy of the requested data, or various file attributes such as file timestamp and size can be compared.

In one embodiment, the determination of whether data has been compromised is accomplished by computing a digital signature for the data, and comparing the digital signature to a control signature; the data is identified as compromised if the digital signature is not identical to the control signature. A control signature can be unique to the requested data, such as a particular Web page. Preferably, control signatures are stored in a database inaccessible through a public computer network.

In one specific type of embodiment, the "data" is information provided in HyperText Markup Language (HTML). In such embodiments, validation of the data can be accomplished by storing a control copy of the HTML information in a database inaccessible through the public computer network; the control copy can be compared with the HTML information to determine whether the information has been compromised. The information may be directly compared or, alternatively, a digital signature can be computed for the HTML data and compared to a control signature associated with the control copy. In such embodiments, if the signatures do not compare, the control copy can be transmitted to a remote user rather than the compromised information.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form, as defined by the scope of the claims recited hereinafter.

BRIEF DESCRIPTION OF THE DRAWINGS

For a more complete understanding of the present invention, reference is now made to the following detailed description taken in conjunction with the accompanying drawings, in which.

DETAILED DESCRIPTION

Figure 1:
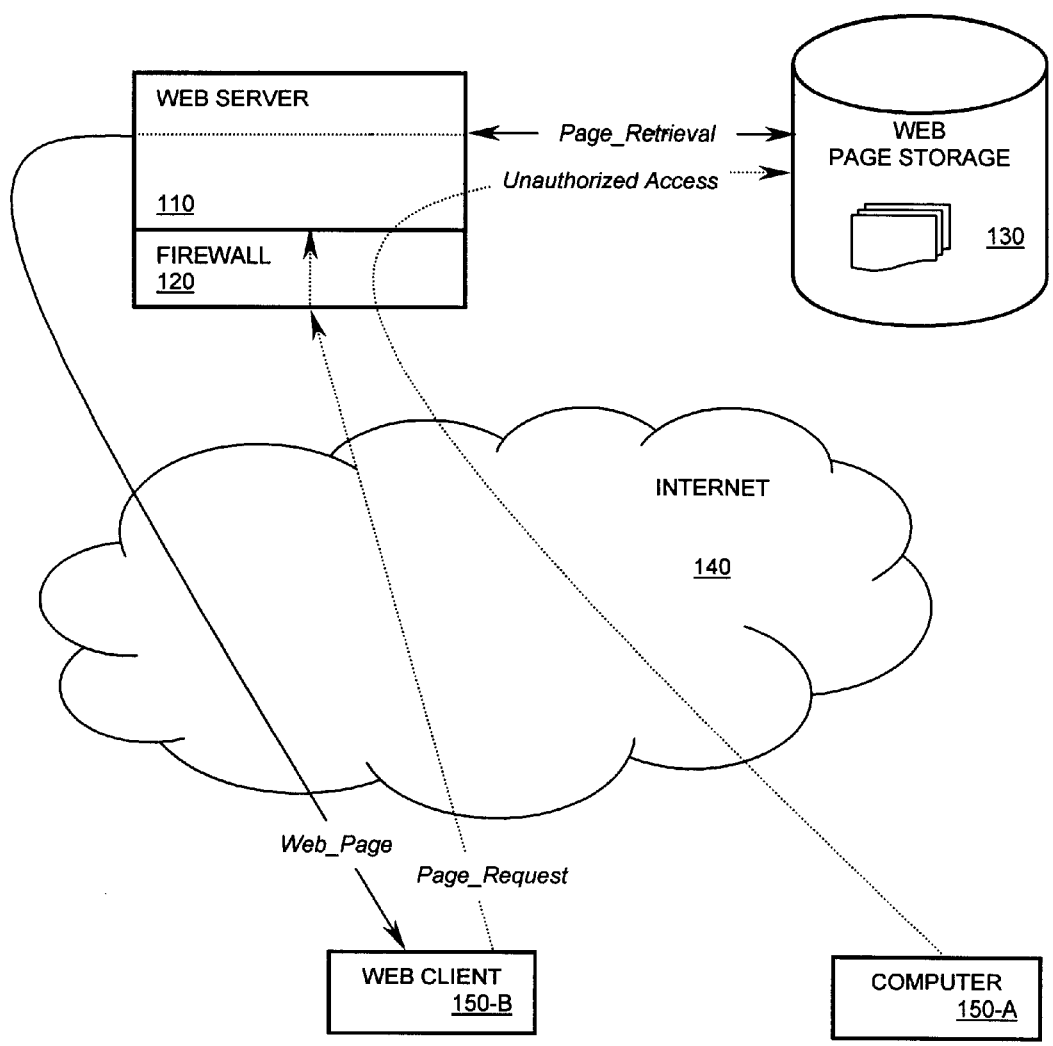
FIG. 1 illustrates a conventional use of a firewall to provide network security.

Referring first to FIG. 1, illustrated is a conventional use of a firewall to provide network security. A Web server 110 is coupled to a network, such as the Internet 140, to receive and service requests for Web pages from remote computers, generally designated 150. As used herein, "Web server" refers, interchangeably, to the physical computer hosting a web server process, as well as the software-definable process that provides the conventional functions of a web server. The Web pages are stored as files in a nonvolatile memory, illustrated as Web Page Storage 130, which is accessible by the Web server 110.

All requests for Web pages are intercepted by a firewall 120, before being passed to the Web server 110. Firewalls can be implemented in both hardware and software, or a combination of both; thus, as used herein "firewall" refers, interchangeably, to either a physical system providing security functions, as well as any software-definable process that provides the conventional security functions of a firewall. Firewalls are frequently used to prevent unauthorized Internet users from accessing private networks connected to the Internet, especially intranets. All messages entering Web server 110 first pass through the firewall 120, which examines each message and blocks those that do not meet specified security criteria.

Although firewall 120 can provide a certain level of protection, experience has shown that firewalls cannot prevent all unauthorized attempts to access protected computers and networks. Thus, as illustrated in FIG. 1, a remote computer 150-A is able to gain unauthorized access to Web page storage 130, even though Web server 110 is "protected" by firewall 120. A legitimate request for a Web page, Page_Request, received from a Web client computer 150-B is verified and passed by the firewall 120 to Web server 110. The Web server 110 retrieves the Web page (Page_Retrieval), and transmits the Web page (Web_Page) to the Web client 150-B. In such prior art systems, however, if the Web page was previously "compromised," such as through the malicious act of a user of computer 150-A, a user of Web client 150-B will receive such compromised Web page. Because either the provider of the Web page or the user of Web client 150-B may not know that the Web page contains compromised data, which may cause damage to the provider or user, it is an object of the present invention to avoid the transmission of compromised data.

Figure 2:
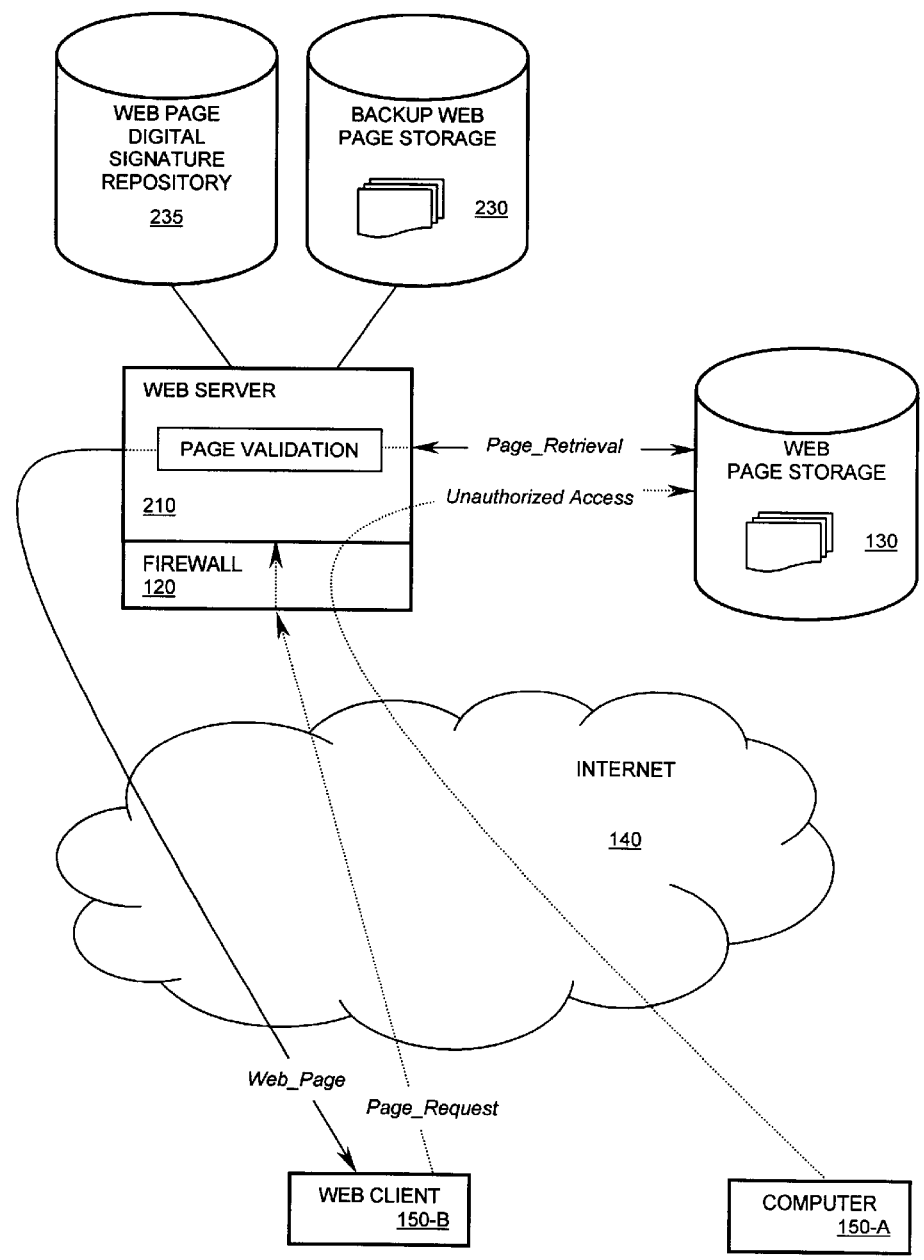
FIG. 2 illustrates a first exemplary embodiment of a system for preventing the transmission of compromised data according to the principles of the present invention.

Turning now to FIG. 2, illustrated is a first exemplary embodiment of a system for preventing the transmission of compromised data according to the principles of the present invention. The key feature of the system depicted in FIG. 2 is the provision of a "validation" function associated with Web server 210. As used herein, "validation" refers to a process of verifying the integrity of data prior to transmission; the term "page validation" is used in the exemplary embodiments described herein because the data to be transmitted comprises Web pages. As illustrated in the description that follows, many different techniques can be used to perform a validation function. Those skilled in the art will recognize that the validation process does not necessarily have to run as part of a Web server. The validation process could be executed on another computer, could be an addition to a firewall, etc.; such alternate embodiments are intended to be within the scope of the claims recited hereinafter.

In FIG. 2, a Web page digital signature repository ("signature repository") 235 is accessible by Web server 210. Alternatively, or in addition to signature repository 235, backup copies of all Web pages stored on Web page storage 130 are stored on a non-volatile storage medium 230 ("backup Web page storage"), which is also accessible by Web server 210. A Web page stored on Web page storage 130 can be validated prior to transmission by comparison of the page with a backup copy stored on backup Web page storage 230, or by comparison of a digital signature of the page with a control signature, which can be stored in signature repository 235. The data stored on backup Web page storage 230 can be encrypted to provide additional security.

Computation of a digital signature can be performed using hash algorithms, or public-key/private-key signature schemes. Examples of such algorithms and schemes include MD5, RIPEMD-160, RIPEMD-128, SHA-1, RSA signature scheme, ElGamal Signature Scheme, and the Digital Signature Standard; the principles of the present invention, however are not limited to use of a particular algorithm or scheme. In one embodiment, every time a request for a Web page is received by Web server 210, a digital signature for the requested page is computed and compared to a control signature. As used herein, a "control signature" is a digital signature corresponding to valid data. Thus, if the digital signature computed for a Web page is not identical to the control signature, it is known that the Web page has been compromised and, thus, should not be transmitted to a requestor.

In one embodiment, unique control signatures are computed for each Web page and stored in signature repository 235, which can, for example, be an SQL database. The control signatures are computed using Web pages that are known to contain valid data. Subsequently, when a request is received for a particular Web page, a digital signature is again computed and compared to the previously computed control signature for the page to determine whether the data in the Web page has been compromised. Alternatively, or in addition to using a signature repository 235, the proper control signature for each Web page stored in Web page storage 130 can be computed at the time of a page request using known valid data for the requested page stored in backup Web page storage 230. Those skilled in the art will conceive of other advantageous methods of using digital signatures to verify the integrity of data prior to transmission; such methods are intended to be within the scope of the claims recited hereinafter.

Figure 3:
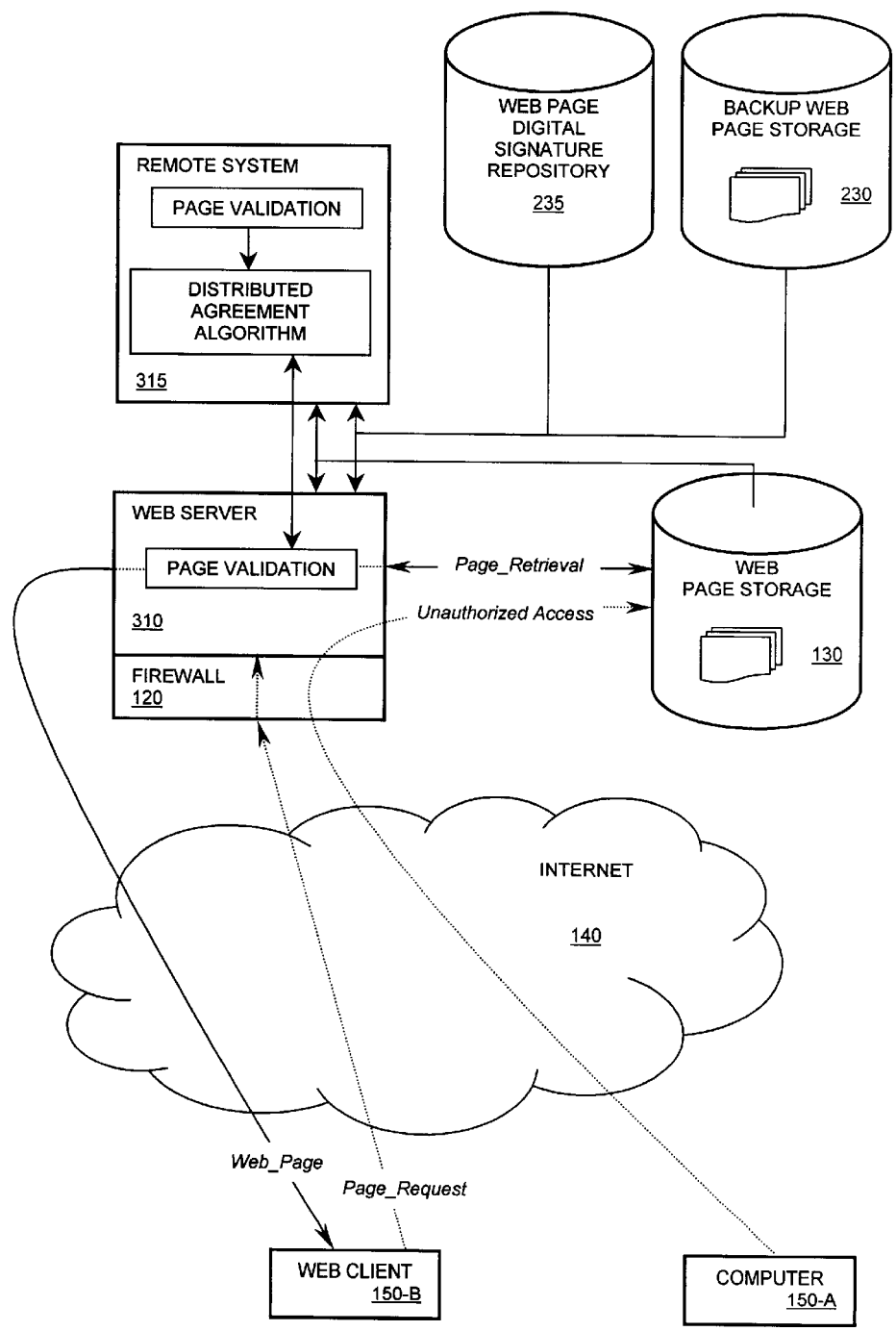
FIG. 3 illustrates a second exemplary embodiment of a system for preventing the transmission of compromised data according to the principles of the present invention.

Turning now to FIG. 3, illustrated is a second exemplary embodiment of a system for preventing the transmission of compromised data according to the principles of the present invention. The system depicted in FIG. 3 is identical to that illustrated in FIG. 2, except that the page validation functions associated with Web server 310 are verified by a remote system 315 executing a distributed agreement algorithm; examples of distributed agreement algorithms include the EIG algorithm for Byzantine Agreement and the Three-Phase commit algorithm. As used herein, use of a distributed agreement algorithm involves running the page validation process on one or more systems in addition to Web server 310. Each system can communicate with every other system to determine whether each system yields the same decision as to whether the transmit the requested Web page; differing results among the distributed processes can be an indication that the page validation functions associated with Web server 310 may be compromised.

Figure 4:
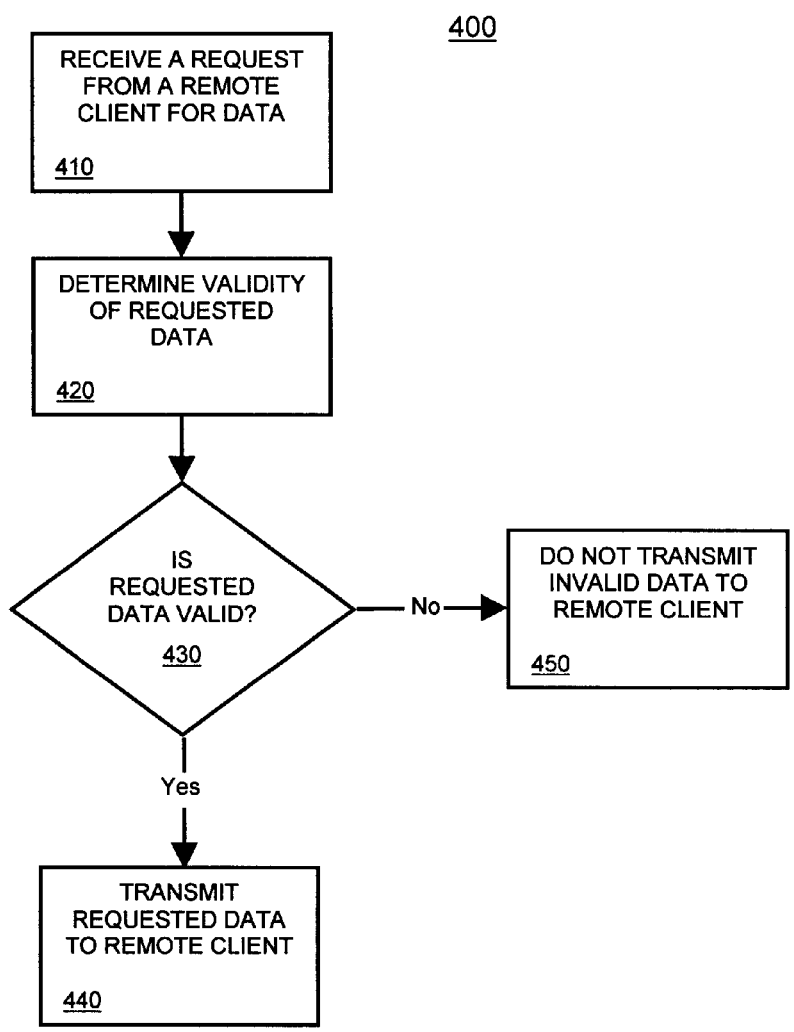
FIG. 4 illustrates an exemplary flowchart of the principles of the present invention.

Referring now to FIG. 4, illustrated is an exemplary flowchart 400 illustrating the principles of the present invention. When a request is received from a remote client for data (Step 410), the validity of the requested data is determined (Steps 420 and 430). If the requested data is not valid, i.e., it is compromised, then it is not transmitted to the remote client (Step 450); if the data is valid, however, the request is fulfilled by transmitting the requested data to the remote client (Step 440). As noted previously, the advantages of the present invention are recognized because of the deficiencies of conventional network security techniques to adequately safeguard data stored in information systems. Rather than try to improve such network security techniques to prevent all unauthorized access to data, the present invention assumes that data will be compromised, either intentionally or otherwise, and provides a fail-safe solution—data is not transmitted unless its integrity is first verified.

Figure 5:
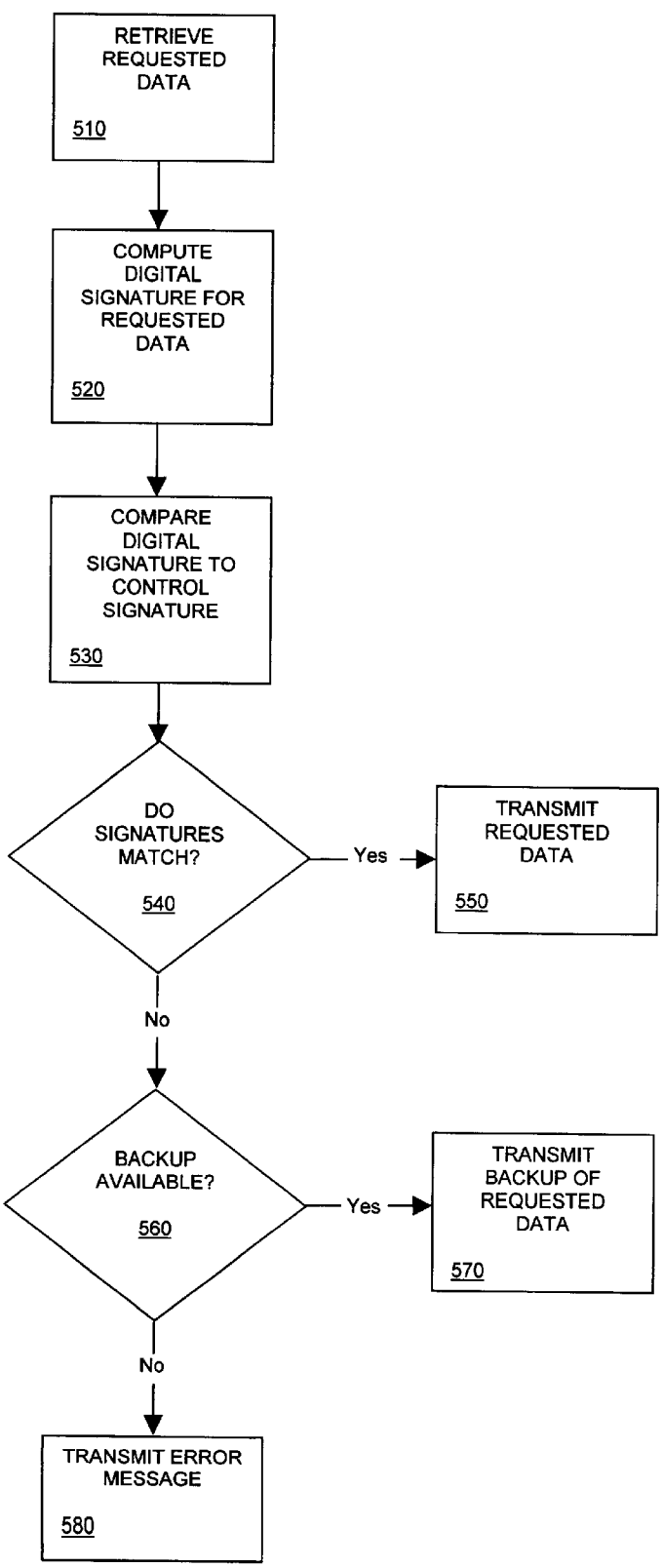
FIG. 5 illustrates an exemplary flowchart of a method for implementing the principles of the present invention.

Finally, turning to FIG. 5, illustrated is an exemplary flowchart of a method 500 for implementing the principles of the present invention. First, the requested data is retrieved (Step 510), and a digital signature is computed for the requested data (Step 520). Second, the digital signature is compared to a control signature (Steps 530 and 540). As described hereinabove, the control signature can be unique to the requested data, or the same for every data unit, such as a Web page. In addition, a control signature can be computed and stored in a secure signature repository or can be computed at the time of a request using a secure backup copy of the requested data (see FIGS. 2 and 3 and description relating thereto), or the control signature can be the same for every Web page or other data unit.

Next, if the digital signature is identical to the control signature, the requested data is transmitted to the requestor (Step 550). If the digital signature is not identical, however, several actions may be taken, either individually or in combination. First, if a backup copy of the requested data is available (Step 560), the backup copy can be transmitted (Step 570). If no backup copy is available, an error message can be transmitted (Step 580). In certain applications, it may be desirable to transmit the requested data, even if it is determined that such data is compromised. In such cases, it is also desirable to transmit an error message to notify a recipient that the data is suspect.

Although the present invention has been described in detail, those skilled in the art will conceive of various changes, substitutions and alterations to the exemplary embodiments described herein without departing from the spirit and scope of the invention in its broadest form; it is intended that the scope of the invention be defined by the claims appended hereto, and their equivalents. The exemplary embodiments described herein are used merely to illustrate the principles of the invention and are not intended to be exhaustive or to limit the invention to the form disclosed; in particular, although the exemplary embodiments described herein illustrate the application of the principles of the present invention to the validation of Web pages prior to transmission, those skilled in the art will recognize that the principles can be advantageously implemented with respect to any type of data.

What is claimed is:

1. A system for preventing transmission of data through a computer network when said data is compromised, said system comprising:

means for intercepting a request from a remote computer for said data;

means for determining whether said data has been altered without authorization; and means for transmitting automatically a secure copy of the requested data to said remote computer if said data has been altered without authorization, wherein said secure copy of said requested data is not altered when said requested data is altered without authorization, and wherein the substitution of said secure copy of the requested data is transparent to a user of said remote computer.

2. The system recited in claim 1, wherein said means for determining whether said data has been altered without authorization comprises:

means for computing a digital signature for said data; and means for comparing said digital signature to a control signature, said data being compromised if said digital signature is not identical to said control signature.

3. The system recited in claim 2, wherein said control signature is unique to said data.

4. The system recited in claim 2, wherein said control signature is stored in a database inaccessible through said computer network.

5. The system recited in claim 1, wherein said data comprises HyperText Markup Language (HTML) data.

6. The system recited in claim 5, wherein said means for determining whether said data has been altered without authorization comprises:

means for storing a control copy of said HTML data in a database inaccessible through said computer network; and means for comparing said HTML data to said control copy.

7. The system recited in claim 6, wherein said means for comparing said HTML data to said control copy comprises:

means for determining a digital signature for said HTML data;

means for determining a control signature for said control copy; and means for comparing said digital signature to said control signature, said HTML data being compromised if said digital signature is not identical to said control signature.

8. A method for preventing transmission of data through a computer network when said data is compromised, said method comprising the steps of:

receiving a request from a remote computer for said data;

determining whether said data has been altered without authorization; and transmitting automatically a secure copy of the requested data to said remote computer if said data has been altered without authorization, wherein said secure copy of said requested data is not altered when said requested data is altered without authorization, and wherein the substitution of said secure copy of the requested data is transparent to a user of said remote computer.

9. The method recited in claim 8, wherein said step of determining whether said data has been altered without authorization comprises the steps of;

computing a digital signature for said data: and comparing said digital signature to a control signature, said data being compromised if said digital signature is not identical to said control signature.

10. The method recited in claim 9, wherein said control signature is unique to said data.

11. The method recited in claim 9, wherein said control signature is stored in a database inaccessible through said computer network.

12. The method recited in claim 8, wherein said data comprises HyperText Markup Language (HTML) data.

13. The method recited in claim 12, wherein said step of determining whether said data has been altered without authorization comprises:

storing a control copy of said HTML data in a database inaccessible through said computer network; and comparing said HTML data to said control copy.

14. The method recited in claim 13, wherein said step of comparing said HTML data to said control copy comprises:

determining a digital signature for said HTML data;

determining a control signature for said control copy; and comparing said digital signature to said control signature, said HTML data being compromised if said digital signature is not identical to said control signature.

15. A web server for transmitting requested data to a remote client through a computer network, said web server comprising;

a computing system including a processor and random access memory;

a non-volatile storage medium for storing said data; and a software-defined process executable by said computing system, said software-defined process and said computing system cooperating to:

i) receive a request from said remote client for said requested data;

ii) determine whether said requested data has been altered without authorization; and iii) transmit automatically a secure copy of the requested data to said remote client if said data has been altered without authorization, wherein said secure copy of said requested data is not altered when said requested data is altered without authorization, and wherein the substitution of said secure copy of the requested data is transparent to a user of said remote client.

16. The web server recited in claim 15, wherein said software-defined process causes said computing system to determine whether said requested data has been altered without authorization by:

i) computing a digital signature for said data; and ii) comparing said digital signature to a control signature, said requested data being compromised if said digital signature is not identical to said control signature.

17. The web server recited in claim 16, wherein said control signature is unique to said requested data.

18. The web server recited in claim 16, wherein said control signature is stored in a location inaccessible to said computer network.

19. The web server recited in claim 15, wherein said requested data comprises HyperText Markup Language (HTML) data.

20. The web server recited in claim 19, wherein said software-defined process causes said computing system to determine whether said requested data has been altered without authorization by comparing said HTML data to a control copy of said HTML data, said control copy stored in a location inaccessible through said computer network.

21. The web server recited in claim 20, wherein said software-defined process causes said computing system to compare said HTML data to said control copy by:

i) determining a digital signature for said HTML data;

ii) determining a control signature for said control copy; and iii) comparing said digital signature to said control signature, said HTML data being compromised if said digital signature is not identical to said control signature.

22. A method for preventing transmission of data through a computer network when said data is compromised, said method comprising the steps of:

intercepting the transmission of said data to a remote computer requesting said data;

determining whether said data has been altered without authorization; and transmitting automatically a secure copy of the requested data to said remote computer if said data has been altered without authorization, wherein said secure copy of said requested data is not altered when said requested data is altered without authorization, and wherein the substitution of said secure copy of the requested data is transparent to a user of said remote computer.

23. The method recited in claim 22, wherein said step of determining whether said data has been altered without authorization comprises the steps of:

computing a digital signature for said data; and comparing said digital signature to a control signature, said data being compromised if said digital signature is not identical to said control signature.

24. The method recited in claim 23, wherein said control signature is unique to said data.

25. The method recited in claim 22, wherein said data comprises HyperText Markup Language (HTML) data.

26. The method recited in claim 25, wherein said step of determining whether said data has been altered without authorization comprises the steps of:

storing a control copy of said HTML data in a database inaccessible through said computer network; and comparing said HTML data to said control copy.

27. The method recited in claim 26, wherein said step of comparing said HTML data to said control copy comprises:

determining a digital signature for said HTML data:

determining a control signature for said control copy; and comparing said digital signature to said control signature, said HTML data being compromised if said digital signature is not identical to said control signature.

\* \* \* \* \*